United States Patent Office 3,764,403
Patented Oct. 9, 1973

3,764,403
TEMPERING
James E. Neely, Jr., Butler, Pa., assignor to
PPG Industries, Inc., Pittsburgh, Pa.
No Drawing. Filed Nov. 10, 1971, Ser. No. 197,230
Int. Cl. C22f *1/00*
U.S. Cl. 148—13.1                14 Claims

ABSTRACT OF THE DISCLOSURE

Using the heat of sublimation of a cooling medium to temper heated articles, particularly those of glass.

BACKGROUND OF THE INVENTION

This invention relates to tempering heated articles, and particularly relates to tempering articles by using the heat of sublimation of a composition such as soft, solid carbon dioxide particles in the form of snow to chill glass sufficiently rapidly to impart a temper thereto. While the details of the invention will be described in connection with glass sheet tempering, it is understood that other materials such as metals, metal alloys, plastics and glass fibers may also be chilled by applying toward the surface of said article streams of soft, solid carbon dioxide particles, using the heat of sublimation as a most important source of chilling according to the teachings of the present invention.

DESCRIPTION OF THE PRIOR ART

Glass sheets are thermally tempered by heating them to an elevated temperature above the glass strain point and approaching the glass softening point, and then suddenly chilling the glass to cool the glass surface regions relatively rapidly while the inner regions of the glass cool at a slower rate. The differential cooling throughout the glass thickness develops a compressive stress in the glass surface regions which is balanced by a tension stress in the interior of the glass. The resultant tempered glass has a much greater resistance to fracture than untempered glass. Also, in the less frequent times that tempered glass does fracture, its breakage pattern is significantly different from that of untempered glass, because glass shatters into small fragments having blunt round edges which become smaller and more rounded as temper increases, whereas untempered glass fractures to form large pieces having sharp edges. This safe breakage pattern and lesser tendency to fracture makes tempered glass more desirable for use in many articles such as transparent doors, motor vehicle closures, ophthalmic lenses, covers for instrument panels, containers, and the like.

Traditionally, glass has been thermally tempered by impinging blasts of cool air on the surface of heated glass articles. This technique is limited for practical use for tempering relatively thick glass, but not completely acceptable for tempering thinner glass articles. Air has a relatively low heat transfer coefficient. Therefore, it does not remove heat away from the surface of the glass quickly enough to set up a sufficient differential cooling pattern between the surface regions and the interior regions of relatively thin glass articles to impose an adequate temper. As a result, only relatively low degrees of temper can be obtained when air is used to temper thin glass articles.

Strengthening by chemical means, also called chemical tempering, though somewhat newer than the art of thermal tempering, is also well known. There are several mechanisms by which it may be accomplished. One of these entails ion exchange in the surface layers of the glass at a temperature approaching the strain point of the glass. In the ion exchange, relatively small ions, such as sodium, are replaced by larger ions, such as potassium, or smaller ions, such as lithium, are replaced by larger ions, such as sodium and/or potassium. The crowding of the larger ions into the spaces left by removal of the smaller ions produces a compression of the surface layers. Two other mechanisms for chemical tempering entail either ion exchange or partial crystallization, or both, at elevated temperatures, in such a manner that the modified surface layers of glass have a lower coefficient of expansion than the base glass. When an article thus treated is cooled to room temperature, the differential contraction of the surface and interior layers again produces compressive stresses in the surface.

According to a typical operation, increased impact resistance, breaking stress and penetration resistance are secured in glass by chemical tempering. In a typical example with an alkali silica glass, for example, soda lime silica glass, a glass sheet is contacted with a potassium salt at a selected temperature range, preferably above 875 degrees Fahrenheit and below the strain point of the glass, for sufficient time for an exchange to take place in the surface zone of the glass. Preferably, the glass sheet is immersed in a molten bath of a potassium salt, preferably potassium nitrate. During immersion, an exchange takes place wherein potassium from the potassium salt bath is introduced into the glass surface, apparently in exchange for sodium present in the exterior or surface zone of the glass sheet. It is believed that chemical tempering of soda-lime-silica glass is an ion exchange phenomenon wherein potassium ions are exchanged for sodium ions.

Other glass compositions may be chemically tempered by immersion in alkali metal salt baths. For example, an alkali silica glass containing lithium may be advantageously chemically tempered by immersion in a molten bath of a sodium salt or a potassium salt or a mixture thereof at an elevated temperature approaching the strain point of the glass. It is also possible to provide a multiple step chemical tempering operation in which a lithium containing glass has its lithium ions exchanged for sodium ions, which, subsequently, are exchanged for potassium ions in a second immersion wherein the sodium enriched surface zone produced by the first ion exchange operation becomes a potassium enriched surface zone during the second immersion.

After treating the glass composition as recited in the chemical tempering operations described above, the chemical nature of the alkali metal oxide constituents of the surface zone of the glass article is altered radically with replacement of lithium by sodium and/or potassium or sodium by potassium, depending upon the initial glass composition. At the same time the central interior regions of the glass article contain substantially the same concentration of alkali metal as before the treatment.

At lower temperatures the effect of such contact with a molten metal salt is much slower with the result that chemically tempered glass articles are difficult to achieve within the periods of time which are commercially practicable. For example, an immersion of soda-lime-silica glass for one hour in molten potassium nitrate at 700 degrees Fahrenheit does not improve the strength properties of the glass substantially. Much longer periods of immersion at this temperature are required to produce strength compressibility like that achieved in the minimal time periods (5 to 10 minutes) at higher temperatures. At temperatures exceeding 870 degrees Fahrenheit, the desired strength improvement occurs even more rapidly.

The upper limit of the contact temperature depends upon the softening temperature and melting temperature of the glass article under treatment. The contact temperature cannot exceed the melting temperature of the glass composition but it can exceed the strain point and even the softening point of the glass composition under certain circumstances. For example, as long as the glass can be supported properly, the contact temperature can be maintained even at a temperature above the softening temperature of the glass provided the contact at these elevated temperatures is of sufficiently short duration to avoid thermal relaxation of the ion exchange induced strength characteristics. In fact, in some cases it is possible to maintain the contact temperature within the softening temperature range of the particular glass article undergoing treatment. Under these thermal conditions, extremely short contact times can be employed such as on the order of one minute or less.

The depth or thickness of the surface zone of compression depends upon the temperature and the duration of the chemical tempering treatment. Since diffusion is a relatively slow process, the effects of chemical tempering do not penetrate very deeply into the glass. This is reflected in the stress distribution in chemically tempered glass. In such glass, the compressive stress ranges from a relatively high level at the surfaces to zero at a depth of only a few thousandths of an inch below the surface. The rest of the interior of the glass sustains only a very low tensile stress, required to balance the compressive forces in the very thin layers near the surfaces. Thus, it may be seen that chemically tempered glass having the same surface compressive stress as thermally tempered glass may have much less interior tension stress and very much lower specific strain energy. Thus, while its strength in the absence of gross surface abrasions may be the same as that of thermally tempered glass, it does not have the same propensity to disintegrate when broken. It is usually considered a disadvantage in automotive applications where the small size of fragments is as important as the enhancement of strength.

Comparing thermally and chemically tempered glass, the former has the advantage that the greater thickness of the compressive layers on its surface gives it more abrasion resistance. Therefore, thermally tempered glass is superior to chemically tempered glass for use in installations where the glass will be exposed to abrasion. Abrasion wears away the surface portion facing the source of abrasion. Since chemically tempered glass has a thin layer of compression stress compared to thermally tempered glass, abrasion can remove the compression stress zone that gives chemically tempered glass its superior properties of tempered glass more rapidly and readily than the relatively thick compressive stress zone of thermally tempered glass.

The prior art has also suggested the use of liquids instead of air as the cooling medium for thermal tempering. Liquids have higher heat transfer characteristics than air and therefore, are capable of removing heat much more rapidly from the glass surface than air does. This more rapid cooling produces a greater temperature differential between the interior and the surface of the glass cooled, thereby creating a potential to produce a higher degree of temper in the glass than is possible from air tempering. The technique of using liquids to chill glass to impart a thermal temper to the glass is generally referred to in the art as liquid quenching.

Various techniques have been developed to contact the glass surface with liquid. The quenching liquid may be atomized and sprayed on the surface of the glass. Such a technique is well known in the metal tempering art and is disclosed in U.S. Patent No. 3,208,742. Another method of contacting the glass with liquid is to immerse the glass completely in the quenching liquid. This technique is known as immersion quenching or dip quenching and is described in U.S. Patents Nos. 170,339; 2,145,119; 2,198,729; 3,186,816; 3,271,207; and Belgian Patent 729,055.

In conducting the method for thermally tempering glass by liquid quenching, glass is first heated to a very high temperature, usually somewhere near the softening point of the particular glass being tempered. The softening point, as used herein, is that condition in which glass has a viscosity of $10^{7.6}$ poises. The temperature at the softening point of the glass will vary depending on the particular composition of the glass. For example, in a soda-lime-silica glass composition, the temperature at the softening point is about 1400° F. In a boro-silica glass composition this temperature is about 1500° F.

After the glass has been heated to the above-described elevated temperature, it is immediately contacted with a liquid quenching agent where heat is exchanged between the surface of the glass and the liquid. A direct measure of this heat exchange for a given temperature difference between the article undergoing quenching and the tempering medium is the heat transfer coefficient. The heat transfer coefficient is defined as the heat transferred per unit time per unit surface area at the glass-tempering medium interface per unit of temperature difference between the heated, immersed glass body and the surrounding medium. For the purposes of this invention, the heat transfer coefficient, $h$, is expressed as British Thermal Units/hour-square foot-degree Fahrenheit (B.T.U./hr.-ft.$^2$-° F.).

The heat transfer coefficients obtained at the glass-liquid interface using many of the quenching liquids of the prior art do not remain constant with changes in glass temperature during quenching. Generally, after immersing the preheated glass body into the quenching liquid, the heat transfer coefficient rapidly increases as the glass cools in the upper temperature regions of the process. Upon further cooling, the heat transfer coefficient rapidly decreases. This falling off of the heat transfer coefficient with temperature may provide for a relatively low average heat transfer coefficient over the entire temperature range employed in the tempering process and results in a lower degree of temper than expected in the resultant tempered glass article. The degree of temper is particularly poor with thin glass articles quenched in liquids having a heat transfer coefficient that decreases rapidly to a low value prior to the completion of the establishment of permanent stresses due to tempering.

Although liquid quenching has been found to be effective with glass having less thickness than is capable of tempering by air cooling, liquid quenching is frequently accompanied by a large proportion of glass breakage. This breakage is believed to be associated with non-uniform temperature of the different portions of the article when they enter the cooling medium so that the leading edge develops a maximum stress which may cause breakage originating at a surface defect on or near the leading edge. In addition, localized nucleate boiling occurs at surface irregularities in the treated articles to produce a non-uniform uncontrollable temper pattern when the article is tempered by dip quenching in liquid.

In tempering thin glass articles, it is particularly important that the quenching medium provide a relatively high average heat transfer coefficient as compared to air over the entire range of temperature employed in the tempering process. With thin glass, heat exchange between the interior of the glass and the surface is appreciably more rapid than with thicker glass. Therefore, in order to achieve as high a degree of temper in thin glass as is obtainable with thicker glass, the heat flux at the glass-tempering medium interface must be proportionately greater for thin glass than for thicker glass. One way of providing a greater heat flux at the glass-liquid interface is to quench in a medium providing a relatively high average heat transfer coefficient as compared to air over the entire temperature range employed in the tempering process.

It has been found in the practice of this invention in tempering glass, particularly thin glass, the quenching preferably should be done in media which have an average heat transfer coefficient of at least 125 and at most 600 B.T.U./hr.-ft.$^2$-° F., preferably within the range of 200 to 500 B.T.U./hr.-ft.$^2$-° F., as the glass is cooled through the temperature range used in the tempering process. The temperature range used in the tempering process is defined as the surface temperature of the glass near its softening point down to a lower surface temperature at which the interior of the glass has cooled through the glass strain point. The glass strain point as used herein is that condition in which glass has a viscosity of $10^{14.6}$ poises. When glass has been cooled through the strain point, the final degree of temper in the glass has been attained.

In tempering thinner glass, i.e., glass of about 0.050 to 0.090 inch in thickness, to obtain a high degree of temper, a quenching medium should be used which provides an average heat transfer coefficient in the upper portion of the range set forth. With thicker glass, i.e., glass of about 0.100 to 0.500 inch in thickness, a high degree of temper can be obtained using a medium which provides average heat transfer coefficients in the lower portion of the range set forth.

Quenching with a medium which provides an average heat transfer coefficient below the lower limits specified, i.e., below 125 B.T.U./hr.-ft.$^2$-° F. is not recommended because of the poor degree of temper which would be obtained in thin glass Quenching with a medium which provides an average heat transfer coefficient above 600 B.T.U./hr.-ft.$^2$-° F. is not recommended for use with glass articles, since the initial instantaneous surface tension which is developed is too great and would fracture the glass during tempering.

Besides quenching with a tempering medium which provides an average heat transfer coefficient at the glass-tempering medium interface within the above-specified limits, it is also important that the quenching medium provide a relatively high actual heat transfer coefficient as compared to air as the glass is cooled through the lower temperature regions of the tempering process. These lower temperature regions are defined as the glass surface temperature range from near its strain point down to a lower surface temperature when the interior regions of the glass pass through the strain point.

The present invention provides a material having a heat transfer coefficient greater than that of air, that is more uniform throughout the temperature range associated with thermal tempering than those of quenching liquids of the prior art, which material is capable of being supplied substantially uniformly throughout the entire surface of a heated glass sheet to be tempered and which is not subject to nucleate boiling. These characteristics lessen the likelihood of glass breakage during cooling associated with tempering and also lessens the chance of yielding non-uniform temper stress patterns in the quenched article. A preferred material meeting these requirements is solid carbon dioxide in the form of soft particles applied at the sublimation temperature of carbon dioxide to contact the hot surface of the treated article and sublimate on contact to form gaseous carbon dioxide. The heat of sublimation needed to convert the carbon dioxide from the solid state to the gaseous state is used to chill the surface of the treated article.

It has always been felt that the glass to be tempered without fracture should develop a thermal gradient between its surface regions and its interior regions that is not too steep. Therefore, while solid carbon dioxide has been suggested in U.S. Pat. No. 2,197,365 to Kjerrman for use in a cooling bath to harden steel, and has been suggested as a refrigerant for air used to quench an aluminum alloy article in U.S. Pat. No. 3,184,349 to Burwen, the possibility of applying soft, solid particles of carbon dioxide over the entire surface of a heated glass or metal article to chill the glass surface more rapidly than its interior by heat exchange involving the heat of sublimation of the sublimable quenching medium as the primary cooling source has not been suggested prior to the present invention.

SUMMARY OF THE INVENTION

The present invention involves a method of tempering a solid article comprising heating said article to an elevated temperature range sufficient for tempering and while said article is at said elevated temperature range applying toward the surface of said article streams of soft, small particles of a sublimable solid having a sublimation temperature sufficiently below said temperature range to induce a temper in said article. The treated article may be composed of glass or of a metal or of a metal alloy, for example. While the term "tempering" as applied to glass treatment is identical in meaning to the term "hardening" as applied to metal treatment, the present disclosure uses the term "tempering" to describe the thermal treatment of an article of glass or metal or any temperable material comprising first heating the article to said elevated temperature range and then rapidly chilling the hot article by applying toward its surface cooling means comprising a primary source of cooling consisting essentially of streams of soft, small particles of sublimable solid material (preferably $CO_2$) having a sublimation temperature sufficiently below said temperature range at a rate sufficient to induce at least a partial temper or a partial hardening in said article.

DETAILED DESCRIPTION

In conducting the method of thermally tempering glass in accordance with the practice of the instant invention, typically, a flat-glass sheet is first heated to a very high temperature, substantially above its strain point, but below its softening point as in air quenching or in liquid quenching. Above the softening point, glass behaves as a liquid. Between the softening point and the strain point, the glass can be considered to behave as a visco-elastic material and its behavior is particularly susceptible to changes in temperature. Stresses are developed and relieved as the glass is cooled down through these points. If the cooling is rapid enough, the glass surfaces solidify and contract, being put temporarily in tension. However, since the glass core has not cooled to the extent the surfaces have and is still relatively mobile, it can relieve the surface tension by flowing and going temporarily into compression. By the time the core has solidified, its contraction is resisted by the already solid surface layers, which are now put into compression, while the core itself is put into tension.

The stress distribution across the thickness of thermally tempered glass is characteristically parabolic. Typically, the regions of the glass near the surfaces to a depth of about ⅔ of the total thickness (⅓ in each surface) are in compression with a maximum value of the compressive stress at the surface of about 40,000 pounds per square inch. To balance this surface compression, the interior ⅓ of the glass thickness is in tension, the maximum tension at the center of the glass thickness having a value of about one-half the maximum surface compression.

After the glass sheet has been heated to the above-defined temperature within a furnace, it is removed from the furnace to a position where its opposite major surfaces are suddenly quenched by applying soft particles of solid carbon dioxide at its sublimation temperature (194.7° K. or about −110° F.) toward the heated major glass surfaces. The soft particles are in the form of snow and do not harm the hot glass surfaces on contact therewith.

Carbon dioxide has a heat of sublimation of 6031 calories per mole at its temperature of sublimation. This material is capable of providing a heat transfer coefficient of at least 100 B.T.U./ft.$^2$-hr.-° F. to an upper limit that is determined by the mass of solid particles that are sublimed per unit area of treated article quenched per unit time per unit of temperature difference between said article and said particles. The heat transfer coefficient is also affected by the rate of cold carbon dioxide gas that flows with the solid particles toward the surface of the article to be quenched. It is a relatively simple matter to control the heat transfer coefficient of the soft particles of solid carbon dioxide to within the range of 125 to 600 B.T.U./ft.$^2$-hr.-° F. as desired as will be explained below.

The source of the soft, solid particles of carbon dioxide is one or more storage tanks of compressed liquid carbon dioxide maintained at a temperature and pressure sufficient to maintain the carbon dioxide in the liquid state within the pressurized container. The container is provided with an outflow pipe leading to a nozzle through an on-off valve and a control valve to control the flow rate of carbon dioxide. The liquid evaporates at the valve when the pressure is lowered. This evaporation chills a portion of the liquid into the solid state in the form of snow. The carbon dioxide gas escapes through the valve and the nozzle, carrying with it small particles of solid carbon dioxide in the form of snow. These particles have an average size of about $\frac{1}{32}$ to $\frac{1}{4}$ inch and range from less than $\frac{1}{64}$ inch to approximately $\frac{1}{2}$ inch, with a typical size range of $\frac{1}{16}$ inch to $\frac{1}{8}$ inch.

Tempered articles resulting from contacting the surface of heat-softened glass sheets with soft particles of a sublimable material such as solid carbon dioxide to chill the articles rapidly by efficient use of the heat of sublimation are characterized by a more uniform stress pattern and surfaces having optical properties superior to those found in tempered glass articles tempered by liquid quenching. These superior results are found even in glass sheets too thin to develop a suitable temper stress when chilled by air, i.e., glass sheets thinner than 100 mils.

In the prior art, using air, glass sheets of commercial soda-lime-silica glass compositions used for float glass, sheet glass or plate glass having a thickness of 100 mils were able to develop a maximum surface compression stress of about 12,000 pounds per square inch as measured by a refractometer identified as a DSR™ refractometer in an article by R. W. Ansevin entitled, "The Non-Destructive Measurements of Surface Stresses in Glass," published in ISA Transactions, volume 4, number 4, October, 1965.

Less than 6000 pounds per square inch was the maximum surface compression stress obtainable by air tempering sheets of these glass compositions having a thickness of 90 mils. Thinner glass sheets were able to develop maximum surface compression stresses substantially less than 6000 pounds per square inch by air quenching. The present invention enables glass sheets 75 mils thick to develop surface compression stress of more than 15,000 pounds per square inch. Presently, a desire exists for thermally tempered glass sheets 100 mils thick and thinner having a surface compressive stress of more than 10,000 pounds per square inch and for thermally tempered glass sheets 90 mils thick having a surface compression stress of about 6,000 pounds per square inch.

The present invention is capable of developing a large surface compression stress that varies less than 10 percent throughout a plane parallel to the surface stressed in compression that is bounded by a margin having a width approximately equal to twice the thickness of the glass sheet compared to the surface compression stress in the center of the plane of measurement.

The reason for this capability is that it is possible to impart the small, soft particles of solid carbon dioxide substantially uniformly over the entire surface of the glass sheet undergoing treatment. This uniform application of quenching medium differs considerably from the dip quenching technique of cooling in which a heated glass sheet is immersed in a cold liquid so that its lower edge becomes chilled before the upper edge is immersed in the liquid and the immersion of the hot glass causes the temperature of the contacted liquid to rise, thereby reducing the temperature difference between the liquid and the different portions of the glass sheet immersed in the liquid. Articles such as glass sheets that are tempered by liquid quenching, specifically dip quenching, are capable of developing a compression stress of a magnitude commensurate with that produced by sublimation quenching. However, liquid quenching is incapable of uniformly cooling a glass sheet throughout its extent and therefore incapable of developing a stress pattern as uniform as that produced by sublimation quenching.

Spray quenching involves using liquid or spray materials that may clog the nozzle through which the spray is imparted toward the hot glass surfaces. Therefore, spray quenching may not be practical for a commercial operation because of the need to clean the spray nozzles.

Quenching by air is limited in the magnitude of the surface compression stress it can develop. Furthermore, if air blasted at too high a velocity to the heat-softened glass sheet surface, the surface smoothness is deteriorated.

It is understood that while the cooling effect provided by the present invention is primarily the result of sublimation of soft, small particles of a sublimable solid such as carbon dioxide at its sublimation temperature, the nature of the carbon dioxide is such that the sublimable solid particles are imparted in a fluid carrier toward the hot glass surfaces. In a specific embodiment of the present invention, the fluid carrier is gaseous carbon dioxide which escapes through the valve and the nozzle openings toward the surface of the heated article to be quenched, carrying with it the small, soft particles of solid carbon dioxide. It is also understood that the cooling can be affected by the temperature at which the liquid carbon dioxide is stored so that the temperature of the carrier fluid, which is usually sufficiently below the strain point of the glass to chill the glass surface on contact therewith, provides a secondary effect on the rate of cooling of the glass surface contacted by the soft particles of the solid carbon dioxide.

Theoretically, the substitution of carbon dioxide gas for air as the tempering medium results in reducing the heat transfer rate to approximately 81 percent of the heat transfer rate obtained by air quenching at the same rate of flow toward the article to be quenched. However, despite the fact that carbon dioxide gas is not quite as effective as air in its heat transfer characteristics, it does augment to some extent the primary source of heat transfer brought about by sublimation of solid carbon dioxide to the gaseous state on contacting a heated surface. The moving gas that carries the solid sublimable particles also breaks up a barrier that would form on the surface to limit the surface cooling rate.

The following experiments were performed to determine the feasibility of the present invention.

EXAMPLE I

Fire extinguishers storing liquid carbon dioxide at a vapor pressure of 950 pounds per square inch and room temperature estimated at about 80° F. were attached to nozzles of truncated conical configuration having a six degree apex angle. The narrow end of each nozzle was coupled to a pipe of ¾ inch outside diameter. Each pipe was coupled to one or the other of the liquid carbon dioxide fire extinguishers that served as the pressure tanks and included a hand operated on-off valve that controlled the exposure of the liquid within each pressurized tank to the atmosphere. Each of the truncated nozzles had its wider end of 3½ inches inside diameter. The wider end of the nozzles were supported in face to face relation from one another at a distance of six inches from one another.

A copper plate ¼ inch thick and four inches square having a thermocouple buried in the center of the thickness was heated in a furnace to 1250° F., the valves were opened and the copper plate was lowered from the furnace in a vertical plane approximately midway between the opposed wider nozzle ends at a rate of approximately two feet per second into the streams of soft, solid carbon dioxide particles that were directed outward from the wider ends of the truncated conical nozzles. The heat transfer coefficient $h$ in British Thermal Units per hour, per square feet, per degree Fahrenheit was calculated from a curve of continuous temperature versus time measurements of the copper plate with the formula $$h = \frac{3400 \, dT/dt}{(T_p - T_s)}$$

where $dT/dt$ is the average slope of the temperature-time curve for one second intervals determined from the curve developed during said exposure to the streams, $T_p$ is approximately the average plate temperature during the corresponding one second interval calculated from the arithmetic mean of two successive readings, and $T_s$ is the temperature of the quenching medium which was assumed to be the sublimation temperature of carbon dioxide.

Table I indicates the heat transfer coefficient calculated from the data determined after each second of cooling for different plate temperatures during this experiment.

TABLE I

Determination of heat transfer coefficient by sublimation quenching

| Plate temperature (degrees Fahrenheit): | Heat transfer coefficient ($h$) |
|---|---|
| 1185 | 250 |
| 1095 | 255 |
| 1005 | 260 |
| 915 | 265 |
| 835 | 250 |
| 775 | 250 |
| 710 | 250 |
| 655 | 270 |
| 600 | 260 |
| 555 | 260 |

This experiment indicated that sublimation quenching would permit thermal tempering of thin glass since the heat transfer coefficient is sufficiently large and sufficiently uniform over the temperature range normally encountered during tempering.

EXAMPLE II

The experimental set up of Example I was repeated on a copper plate with the wide ends of the nozzles spaced 4½ inches from one another and the tanks of compressed liquid carbon dioxide provided with insufficient liquid for the entire experiment. The heat transfer coefficient was calculated as in Example I. By the end of the experiment, the tanks had been essentially depleted of liquid carbon dioxide.

TABLE II

| Plate temperature (degrees Fahrenheit): | Heat transfer coefficient ($h$) |
|---|---|
| 1180 | 290 |
| 1080 | 290 |
| 985 | 295 |
| 895 | 290 |
| 805 | 300 |
| 745 | *260 |
| 680 | *260 |
| 615 | *235 |
| 580 | *200 |
| 550 | *130 |
| 530 | *110 |

*The asterisks indicate that a reduction in heat transfer coefficient as the plate temperature cooled was caused by a reduction in the concentration of solid particles of carbon dioxide in the medium applied against the copper plate surfaces as the supply of compressed liquid carbon dioxide became depleted as the experiment proceeded.

EXAMPLE III

The apparatus used in Examples I and II was used to apply soft, solid particles of carbon dioxide toward glass sheets. In each instance, the glass sheet was of drawn sheet glass six inches square and was heated within a furnace to a temperature of 1250° F. and then moved into a position between the aligned nozzles.

Table III records the nozzle to nozzle spacing, the thickness of glass sheets treated, the duration of treatment, and the surface compression stress developed at the center of the treated sheet for four sheets treated by the test apparatus.

TABLE III

| Glass thickness (mils) | Distance between nozzles (inches) | Duration of quench (seconds) | Center surface compression stress (p.s.i.) | Range of surface compression stress outside center |
|---|---|---|---|---|
| 75 | 24 | 7 | 15,600 | 14,100–16,200 |
| 71 | 18 | 6 | (b) | (b) |
| 64 | 18 | 6 | (b) | (b) |
| 73 | 30 | (a) | 11,000 | 9,400–11,500 | a Solid carbon dioxide was consumed before quench was completed.
b Plate shattered during experiment due to mechanical malfunctions of test apparatus.

EXAMPLE IV

Glass sheets 12 inches square of commercial sheet glass 73 to 75 mils thick were heated in a furnace and moved into a position between a pair of aligned opposed pyrimidal shaped nozzles, each having a 12-inch square nozzles opening, a length of 18 inches and subtended apex angle of 35 degrees. The nozzles were spaced four inches apart from nozzle opening to nozzle opening facing the opposite surfaces of the glass.

The nozzles were supplied with a snow of soft particles of solid carbon dioxide in a gaseous stream from a 1000 pound capacity tank of liquid carbon dioxide maintained at a vapor pressure of about 280 pounds per square inch at a tank temperature of about zero degrees Fahrenheit. A conduit connecting each nozzle to the tank was made as short as possible. The conduits were insulated from the atmosphere and had both a flow rate control valve and a solenoid-actuated on-off valve. The control valves were adjusted to approximately ¼ the flow rate capacity of this system for some samples and to approximately ⅓ the flow rate capacity of the system for other samples.

One glass sheet heated to approximately 1185° F. while so treated, developed a surface compression stress of 7800 pounds per square inch at the center of the sheet after being chilled with solid particles of carbon dioxide at a flow rate of approximately ⅓ capacity of the system. Another glass sheet heated to a glass surface temperature of approximately 1270° F. just prior to quenching developed a surface compression stress of 10,400 pounds per square inch at the center of the sheet after exposure to solid particles at a flow rate of ¼ capacity of the system.

EXAMPLE V

In another experiment, nozzles of truncated conical shape 26 inches long having an 18 degree subtended angle at the apex and a nozzle opening of 10½ inch diameter were placed in facing relation aligned opposite one another at a four inch spacing between the nozzle openings. A glass sheet of commercial sheet glass 75 mils thick and 12 inches square was heated to a surface temperature of approximately 1210° F. and immediately contacted with solid particles of carbon dioxide snow supplied to the nozzles from a tank of liquid carbon dioxide maintained at a pressure of 260 pounds per square inch through a needle valve adjusted for a flow rate of approximately ⅓ the capacity of the system. A ring of demarcation appeared in the glass sheet denoting non-uniform tempering. The experiment was repeated using the same parameters except for a 16-inch separation between nozzle openings and 10 seconds of exposure of the heated glass to the solid carbon dioxide particles. No demarcation line was observed in the treated glass sheet.

The surface compression stress of the latter sample measured 8600 pounds per square inch at the center of the sheet and 8350 pounds per square inch at points approximately one inch from the top and bottom edges of the sheet, respectively.

It is understood that lowering the temperature of the liquid carbon dioxide in the tank increases the proportion of solid to gas in the tempering medium that is applied to the article to be treated. This can result in an increase in the $h$ value of the tempering medium, thereby improving the temper obtained.

It is obvious from the above experiment that surface compression stresses considerably in excess of those possible with air quenching have been obtained using sublimation quenching as taught by the present invention.

While the experiments performed with sublimation quenching reported above were accomplished with metal and glass sheets, it is understood that sublimation quenching of the type envisioned may also be performed with sheets that are shaped or with articles other than sheets. For example, in the formation of fiber glass strands extruded through an apertured bushing, it is customary to cool the newly formed strands by blowing air between the extruded strands. The application of soft, solid particles of carbon dioxide between the extruded strands is capable of producing a more uniform strand than is possible with prior art technique such as developed by U.S. Pat. No. 3,271,122 to Denniston et al., which suggests applying air at a controlled temperature and humidity in the direction of strand movement.

While the specific examples enumerated above relate to sublimation quenching involving the use of carbon dioxide, which is the preferred material suggested for performing the present invention, it is understood that other sublimable materials may be used instead of carbon dioxide. These other sublimable materials, while not as efficient as carbon dioxide or not as desirable to use because of their relatively higher cost or lesser efficiency because they sublimate at higher temperatures than carbon dioxide, are nevertheless suggested for use in tempering involving sublimation and include:

aluminum butoxide (sublimes at 180° C.)
aluminum chloride (sublimes at 178° C.)
ammonium benzoate (sublimes at 160° C.)
ammonium bromide (sublimes at 452° C.)
ammonium carbamate (sublimes at 60° C.)
ammonium carbamate acid
ammonium chloride (sublimes at 340° C.)
ammonium fluoride
ammonium fluoborate
ammonium osmium chloride (sublimes at 170° C.)
ammonium salicylate
ammonium thiocarbonate
antimony fluoride (sublimes at 319° C.)
camphor (different forms sublime below 210° C.)
molybdenum oxydichloride
molybdenum oxytetrachloride
molybdenum oxytrichloride (sublimes at 100° C.)
molybdenum oxydifluoride (sublimes at 270° C.)
nickel dimethylglyoxime (sublimes at 250° C.)
niobium oxybromide
niobium oxychloride (sublimes at 400° C.)
zirconium tetrachloride (sublimes at 331° C.)
zirconium tetrabromide (sublimes at 357° C.)

The form of the invention described above represents a preferred embodiment and certain modifications thereof. It is understood that various changes may be made without departing from the spirit of the invention as defined in the claimed subject matter which follows.

What is claimed is:

1. A method of tempering an article made of a temperable material, comprising heating said article to an elevated temperature range sufficient for tempering and while said article is at said elevated temperature range applying toward the surface of said article cooling means comprising a primary source of cooling consisting essentially of streams of soft, small particles of a sublimable solid material having a sublimation temperature sufficiently below said temperature range at a rate sufficient to induce at least a partial temper in said article and insufficient to cause breakage.

2. A method as in claim 1, wherein said sublimable solid material is imparted in a moving fluid carrier toward said surface.

3. A method as in claim 1, wherein said article is composed of a metal or a metal alloy.

4. A method as in claim 2, wherein said sublimable solid material is carbon dioxide.

5. A method as in claim 4, wherein said solid carbon dioxide is imparted in a gaseous carbon dioxide carrier toward said surface.

6. A method as in claim 1, wherein said article is composed of glass.

7. A method as in claim 6, wherein said sublimable solid material is composed of soft particles of carbon dioxide.

8. A method as in claim 7, wherein said soft particles of solid carbon dioxide are dispensed toward the heated glass surface at a rate sufficient to develop a heat transfer coefficient of between 125 and 600 British Thermal Units per hour per square foot per degree Fahrenheit at the glass surface.

9. A method of tempering a glass sheet comprising heating said glass sheet to be tempered to an elevated temperature range sufficiently high to impart a temper thereto on sudden chilling and applying cooling means comprising a primary source of cooling consisting essentially of soft particles of a solid material having a sublimation temperature below the strain point of the glass and capable of sublimation on contact with a hot surface to the surface of said glass sheet while said glass sheet is within said elevated temperature range and said soft particles are at the temperature of sublimation of said material at a rate sufficient to develop a heat transfer coefficient of between 125 and 600 British Thermal Units per hour per square foot per degree Fahrenheit at said heated surface to impart at least a partial temper to the glass sheet when said solid particular material sublimates in the vicinity of the heated glass surface.

10. The method according to claim 9, wherein the solid material is carbon dioxide.

11. A method as in claim 9, comprising applying said solid particles of sublimable material substantially uniformly over the surface of said glass sheet.

12. A method as in claim 9, wherein said soft solid particles are imparted in a fluid carrier toward said hot surface.

13. The method as in claim 12, wherein said fluid carrier is gaseous carbon dioxide.

14. The method as in claim 9, wherein said glass sheet has a maximum thickness of approximately 100 mils.

References Cited
UNITED STATES PATENTS 3,416,977   12/1968   Rein _____ 148—125
2,131,406    9/1938   Mosmieri et al. _____ 148—143

RICHARD O. DEAN, Primary Examiner

U.S. Cl. X.R.

62—62; 65—12, 114; 148—13.2, 20.3, 27, 125, 143; 264—346, 348